United States Patent [19]
Matsuyama et al.

[11] Patent Number: 5,548,757
[45] Date of Patent: Aug. 20, 1996

[54] METHOD AND APPARATUS FOR APPENDING INFORMATION TO DATA FILES, ENSURING PROPER END-OF-FILE INDICATION

[75] Inventors: Tsutoshi Matsuyama; Hideyuki Takahashi, both of Kawasaki, Japan

[73] Assignee: Fujitsu Limited, Kawasaki, Japan

[21] Appl. No.: 448,297

[22] Filed: May 23, 1995

Related U.S. Application Data

[63] Continuation of Ser. No. 266,380, Jun. 27, 1994, abandoned.

[30] Foreign Application Priority Data

Oct. 14, 1993 [JP] Japan ..................... 5-256814

[51] Int. Cl.⁶ .................................. G06F 12/00
[52] U.S. Cl. .................... 395/600; 364/DIG. 1; 364/245.1; 364/222.81; 364/282.1; 375/822; 375/848
[58] Field of Search .................... 395/600, 822, 395/848; 364/DIG. 1

[56] References Cited

U.S. PATENT DOCUMENTS

| | | | |
|---|---|---|---|
| 3,670,310 | 6/1972 | Bharwani et al. | 340/172.5 |
| 4,510,567 | 4/1985 | Chang et al. | 364/300 |
| 4,761,737 | 8/1988 | Duvall et al. | 395/419 |
| 4,862,410 | 8/1989 | Fukunaga | 364/900 |
| 4,974,189 | 11/1990 | Russon et al. | 364/900 |
| 5,010,514 | 4/1991 | Kippenhan | 364/900 |
| 5,034,914 | 7/1991 | Osterlund | 364/900 |
| 5,226,155 | 7/1993 | Iijima | 395/600 |
| 5,274,813 | 12/1993 | Itoh | 395/700 |
| 5,287,478 | 2/1994 | Johnston et al. | 395/425 |
| 5,414,826 | 5/1995 | Gargia | 364/200 |

FOREIGN PATENT DOCUMENTS

| | | |
|---|---|---|
| 1-243143 | 9/1989 | Japan . |
| 2-143343 | 6/1990 | Japan . |
| 3-99343 | 4/1991 | Japan . |
| 3-271841 | 12/1991 | Japan . |

*Primary Examiner*—Thomas G. Black
*Assistant Examiner*—Jean R. Homere
*Attorney, Agent, or Firm*—Nikaido, Marmelstein, Murray & Oram LLP

[57] ABSTRACT

New data is appended to a file having a first end-of-file information at the end thereof, and even in the case where a hazardous state such as a system failure or shortage of storage area unexpectedly occurs during data write operation, the data in the file which existed before the occurrence of the hazard can be read. First, new data having a second end-of-file information at the end thereof is written subsequently to the first end-of-file information of the file, and when the writing of the new data with the second end-of-file information is completed, the first end-of-file information of the file is altered to continuation information indicating continuity of the file. Accordingly, even if the write operation unexpectedly fails due to system failure or shortage of storage area, at least one end-of-file mark exists in the file, whereby the effective last update point can be specified by the second end-of-file information.

4 Claims, 8 Drawing Sheets

METHOD AND APPARATUS FOR APPENDING INFORMATION TO DATA FILES, ENSURING PROPER END-OF-FILE INDICATION

This application is a continuation of application Ser. No. 08/266,380 filed Jun. 27, 1994, now abandoned.

BACKGROUND OF THE INVENTION

(1) Field of the Invention

The present invention relates to a method and an apparatus for appending records, and more particularly, to a method and apparatus of this kind by which an effective last update point of a file including end-of-file information at an end thereof is reliably retained when new data of variable length is appended to the file.

(2) Description of the Related Art

In a database system, for example, a log file is used to save historical information such as update data, and each time a user performs an operation, historical information indicating such operation is sequentially appended to (added to the end of) the log file. When information is appended to the log file, the location in the file where the information is to be written, that is, the end point of effective data in the file, is identified, and the information is written subsequently to the end point.

Figure 11A:
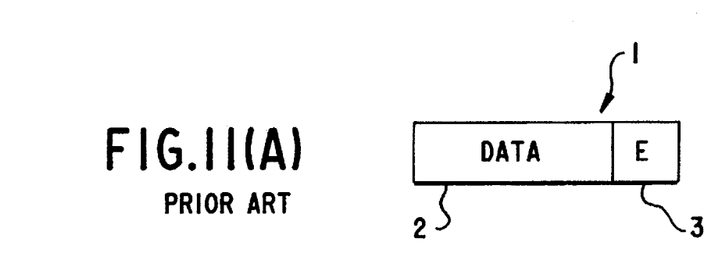
FIGS. 11(A) and 11(B) are diagrams showing an example of a conventional method for appending records to a file.
Figure 11B:
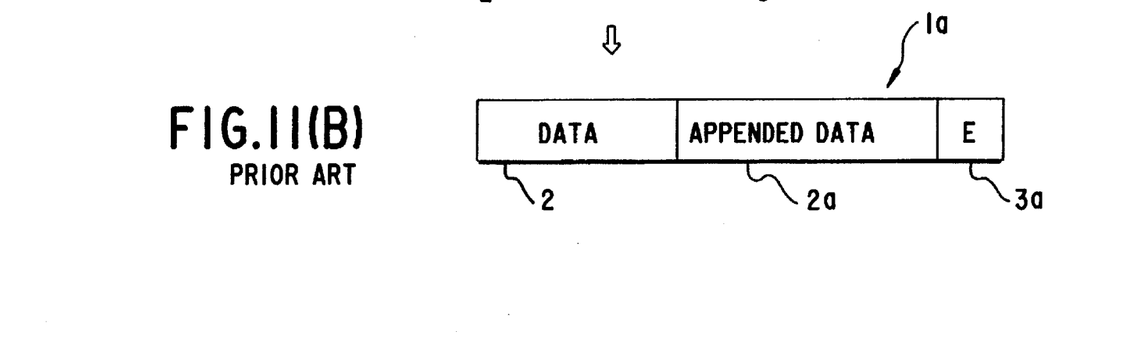

FIGS. 11(A) and 11(B) illustrate, by way of example, a conventional method of appending records to a file. As seen from the file structure shown in FIG. 11(A), a file 1 is composed of data 2, and end-of-file (EOF) information 3 specifying the effective range of the data 2 from the beginning of the file 1 to the end of the data 2. Thus, when reading the data, the file 1 is read from the beginning thereof, and upon detection of the end-of-file information 3 indicating the end of the file 1, it is judged that the file 1 has been read through to the end of the data 2.

FIG. 11(B) illustrates the structure of a file 1a to which data has been appended. New data 2a is written immediately subsequent to the existing data 2, that is, from the location where the end-of-file information 3 exists, and end-of-file information 3a is written following the end of the appended data 2a.

In the conventional record storing method in which end-of-file information is written at the end of effective data, however, if the system unexpectedly goes down due to, for example, power outage, while data is being appended and end-of-file information is not yet written, a file with no end-of-file information can possibly be created. Also in cases where the storage area runs short while data is appended, a file with no end-of-file information can be created because the data can only partially be written. Even if such a file with no end-of-file information can be read later, the end point of the file, that is, the last update point of the data, cannot be identified because the end-of-file information cannot be detected. It is, therefore, impossible to determine the range of correct data.

SUMMARY OF THE INVENTION

An object of the present invention is to provide a method and an apparatus for appending records, by which even if a hazardous state unexpectedly arises, for example, the system goes down or the storage area runs short, while data is appended, the data appended at least before the occurrence of the hazard can be reliably recovered when a file is read later.

To achieve the above object, according to one aspect of the present invention, there is provided a record appending method for appending new data to a file having a first end-of-file information at an end thereof. The record appending method comprises writing new data having a second end-of-file information at an end thereof, subsequently to the first end-of-file information of the file, and altering the first end-of-file information of the file to continuation information indicating continuity of the file.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention is outlined first.

Figure 1:
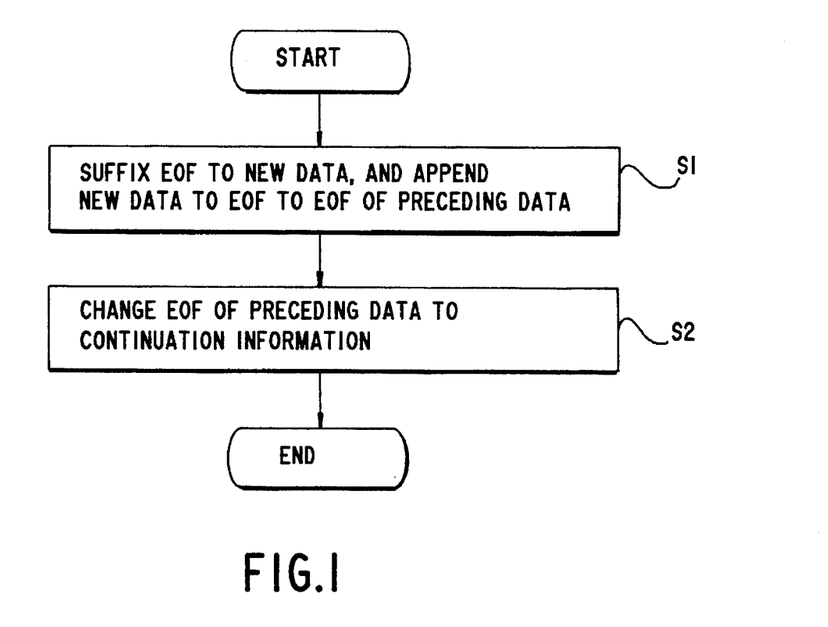
FIG. 1 is a flowchart illustrating the principles of the present invention.

FIG. 1 is a flowchart illustrating the principles of the present invention for achieving the aforementioned object. In a record appending method according to the present invention, when new data is to be appended to a file having first end-of-file information at an end thereof, second end-of-file information is first suffixed at the end of the new data and then the new data is written subsequently to the end-of-file information of the file, in Step S1. After the writing of the new data with the second end-of-file information is completed, the first end-of-file information at the end of the file is changed to continuation information which indicates continuity of the file, in Step S2.

The above method ensures that whenever data is written normally, the file has end-of-file information at the end thereof. Even in the event that a hazardous state occurs during a period between the start and completion of the write operation, at least one end-of-file mark exists in the file. Accordingly, when the file is read again, the end-of-file information detected first can be regarded as the end of the file. Further, in cases where new data fails to be written in its entirety due to shortage of file creation area, the end of the file can be located since the end-of-file information is retained.

The embodiment of the present invention will be now described in detail.

Figure 2:
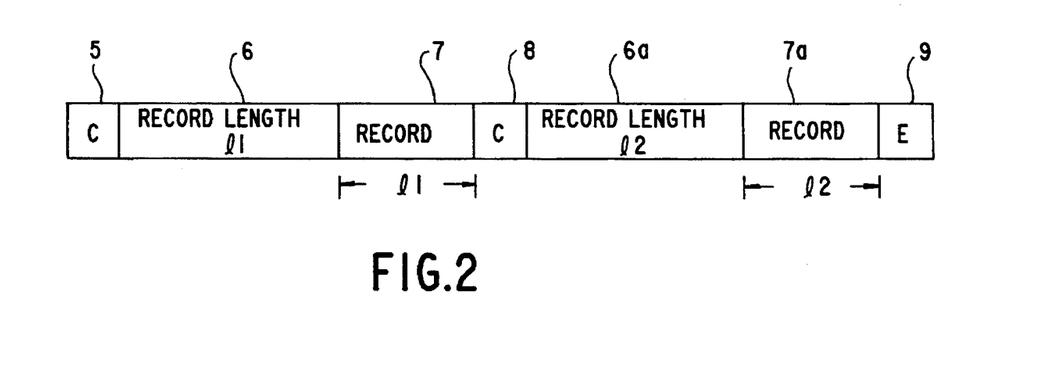
FIG. 2 is a diagram showing an example of a file structure

FIG. 2 illustrates an example of a file structure. The file is composed of characters of one dimensional array created in, for example, an external storage device, and a desired length of characters can be read/written on a character basis at a desired read/write location which is freely alterable.

In FIG. 2, reference numeral 5 denotes a header which is created at the beginning of a file when the file is prepared. When a new file is created, the header 5 is "E" which indicates the end of the file (end-of-file information). A record length 6 and a record 7 following the header 5 are the first-written data. The record length 6 represents the data length of the subsequent record 7, i.e., the string length El. Reference numeral 8 denotes continuation information "C". When the first data is written, this information 8 represents end-of-file, and after this end-of-file information 8 has been written, the header 5 is changed from "E" which is the end-of-file information to "C" which represents continuation information. A record length 6a and a record 7a are the second-written data, and 9 represents end-of-file information. After this end-of-file information 9 is written, the information 8 is changed from "E" (end-of-file information) to "C" (continuation information), as illustrated in the figure. Thus, the file has a structure wherein data and continuation information are alternately arranged, and has end-of-file information at the end thereof.

Figure 3:
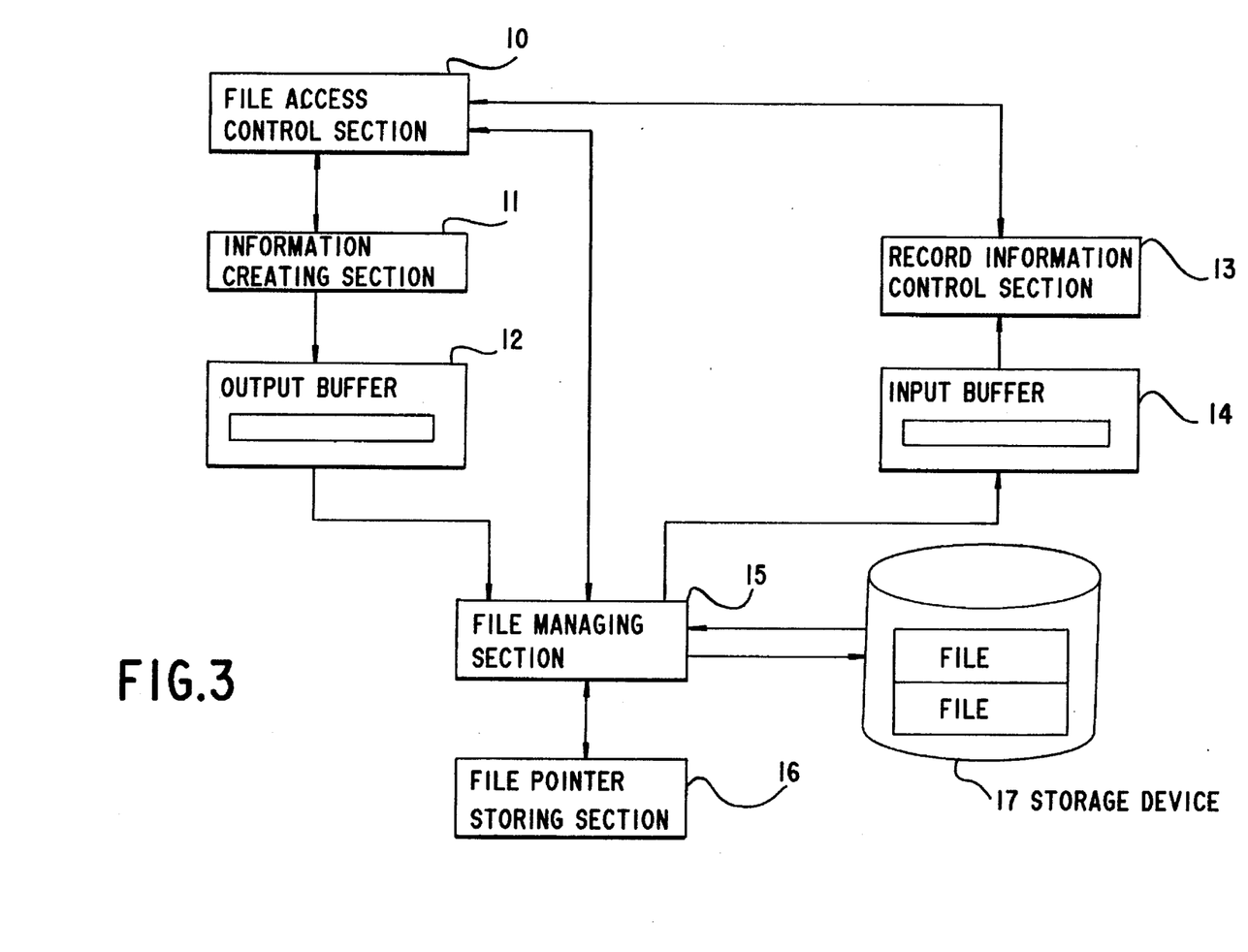
FIG. 3 is a diagram showing the configuration of a record appending apparatus according to the present invention.

FIG. 3 illustrates the configuration of a record appending apparatus according to the present invention. As illustrated, the record appending apparatus comprises a file access control section 10, an information creating section 11, an output buffer 12, a record information control section 13, an input buffer 14, a file managing section 15, a file pointer storing section 16, and a storage device 17 comprising an external storage device, such as a magnetic disk, for storing files.

The file access control section 10 administers the entire control relating to file read/write operation. For example, the control section 10 receives a record to be appended to a file, as well as a record length from a user when the record is to be appended to the file, notifies a read record to the user during file retrieval, and operates a file pointer.

The information creating section 11 creates a record length and a record, supplied to the file access control section 10, and also creates end-of-file information and continuation information. The record length, record, end-of-file information and continuation information created by the section 11 are temporarily stored in the output buffer 12.

The record information control section 13 detects the continuation information and the record length and thereby identifies the record, based on information written in the input buffer 14 by a desired data length, when data is read from a file.

The file managing section 15 actually reads/writes data from/to a file. On receiving a read or write request from the file access control section 10, the file managing section 15 accesses the storage device 17 and stores read data in the input buffer 14, or writes the data stored in the output buffer 12 to a predetermined file in the storage device 17.

The file pointer storing section 16 stores the file pointer which indicates the data write or read position with respect to the file. When the file managing section 15 accesses a file to read or write data, the file pointer storing section 16 is looked up or updated.

Figure 4:
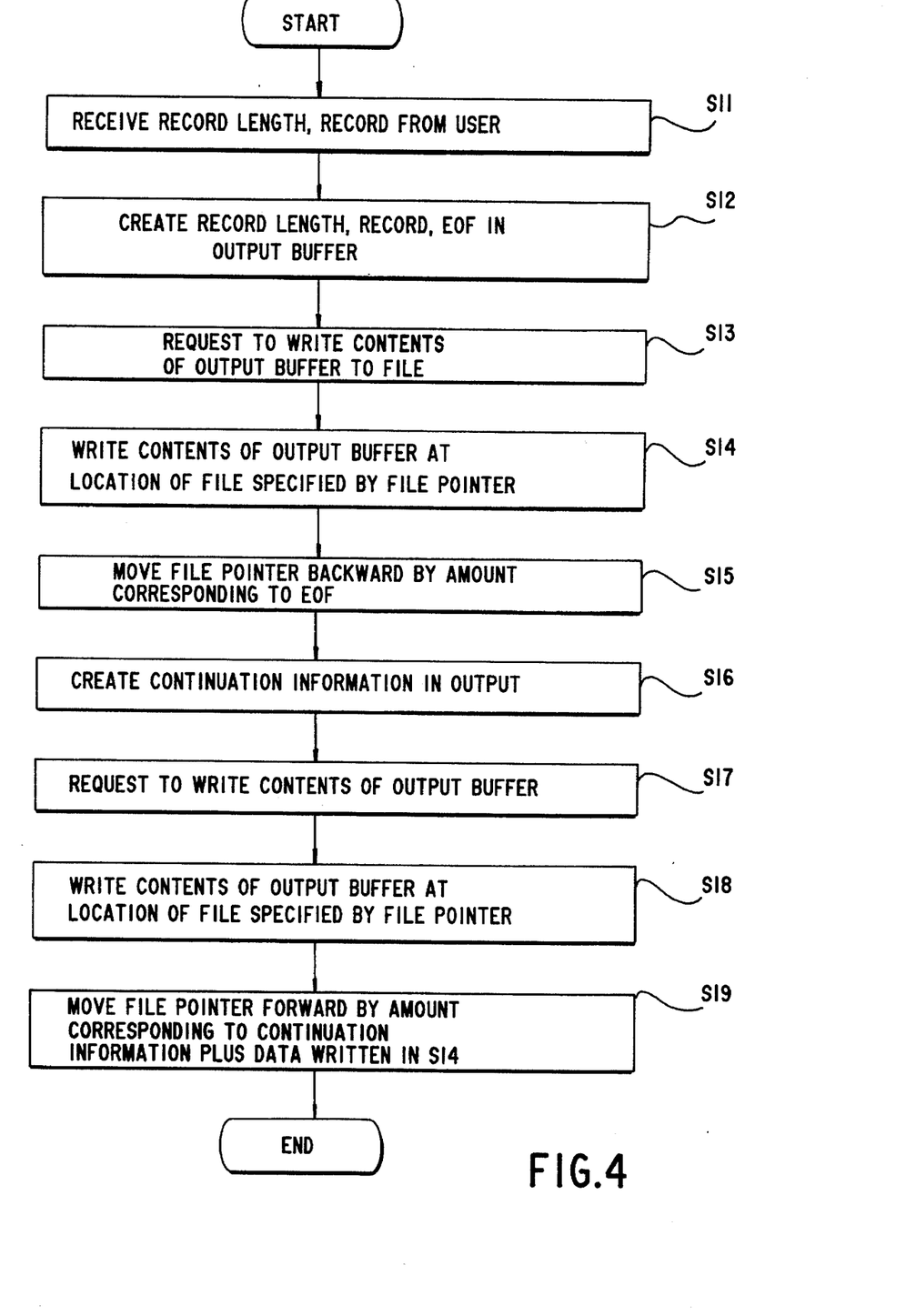
FIG. 4 is a flowchart showing an example of a process for writing a record to a file.

FIG. 4 is a flowchart showing an example of a process for appending a record to a file. It is here assumed that when a record is appended to a file, the file pointer points to the end of the first header (or the end of the end-of-file information in cases where the file contains data).

When data is appended to a file, first, the file access control section 10 receives a record length and a record from a user (Step S11). The information creating section 11 creates a record length, a record, and end-of-file information in a format according to which data is to be written in the file, and stores the created information in the output buffer 12 (Step S12). The file access control section 10, when notified that the information creating section 11 has completed the creation of information, requests the file managing section 15 to write the contents of the output buffer 12 to the file (Step S13). On receiving the request, the file managing section 15 writes the contents of the output buffer 12 at a location of the file specified by the file pointer, i.e., at the end of the header or end-of-file information (Step S14).

Subsequently, the file managing section 15 moves the file pointer backward (toward the beginning of the file) by an amount corresponding to the length of the header or end-of-file information (Step S15). The information creating section 11 creates continuation information and stores the same in the output buffer 12 (Step S16). The file access control section 10 then requests the file managing section 15 to write the contents of the output buffer 12 to the file (Step S17). The file managing section 15 writes the contents of the output buffer 12 at the location specified by the file pointer, whereby the header or end-of-file information is altered to the continuation information (Step S18). Then, the file managing section 15 moves the file pointer forward (toward the end of the file) by an amount corresponding to the length of the continuation information plus the length of the data written in Step S14; namely, the file pointer is advanced to the end of the end-of-file information (Step S19).

Figure 5:
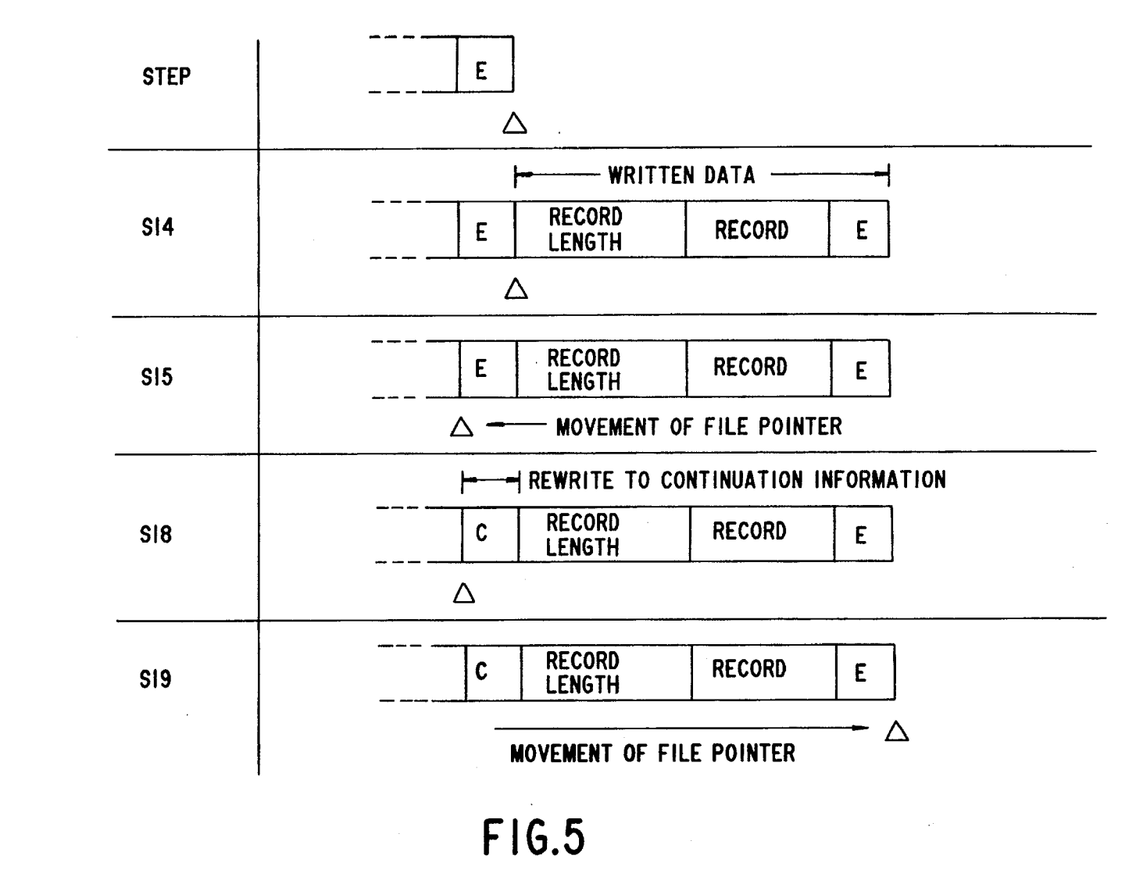
FIG. 5 is a diagram showing a change of the file structure.

FIG. 5 illustrates how the file structure changes, wherein the change of the file structure is shown in relation to the steps in FIG. 4. When a file is newly created, it contains only a header and ends with end-of-file information "E". The file pointer first points to the beginning of the file, and when a write request is generated, the file pointer is moved to the end of the header or end-of-file information. In the figure, the position of the file pointer is indicated by ∆.

In Step S14, data consisting of the record length and record and the end-of-file information are written from the position where the file pointer is located, and in Step S15, the file pointer is moved backward by an amount corresponding to the length of the end-of-file information "E". Then, in Step S18, the end-of-file information "E" is altered to continuation information "C", and in Step S19, the file pointer is moved to the end of the end-of-file information "E" and stands by for appending of subsequent data.

Figure 6:
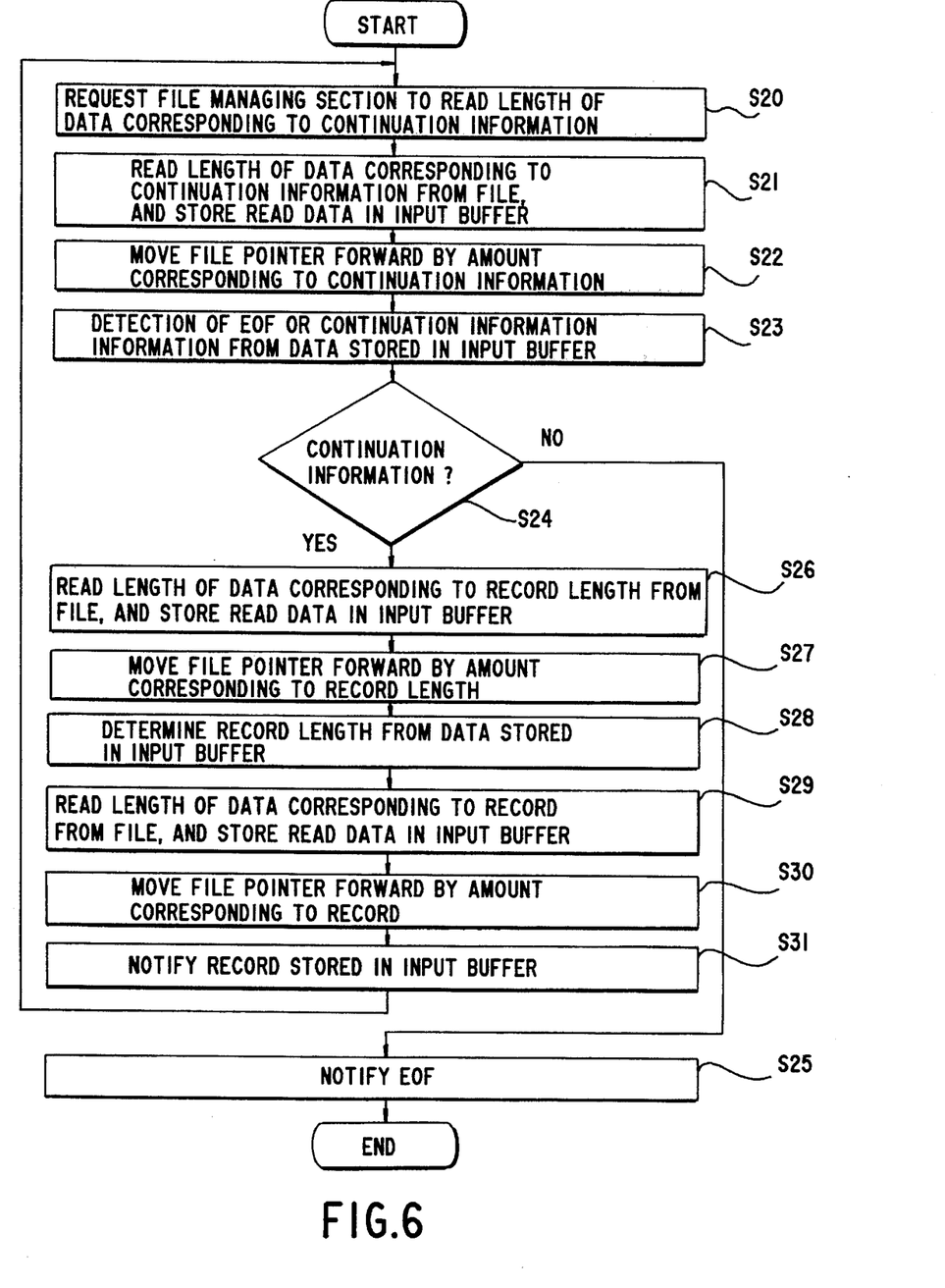
FIG. 6 is a flowchart of a process for reading records from a file.

FIG. 6 is a flowchart of a process for reading data from a file. It is here assumed that the file pointer first points to the beginning of the file.

When data is to be read from a file, the file access control section 10 requests the file managing section 15 to read a length of data corresponding to the continuation information (=end-of-file information) from the file (Step S22). The file managing section 15 reads a length of data in the file corresponding to the continuation information from the position of the file pointer, and stores the read data in the input buffer 14 (Step S21). The file managing section 15 then moves the file pointer forward by an amount corresponding to the length of the read data (Step S22). The record information control section 13 determines whether the information stored in the input buffer 14 is end-of-file information or continuation information (Step S23). If the stored information is end-of-file information (Step S24), the read operation is terminated since the end-of-file (EOF) is reached (Step S25); if the stored information is continuation information, the read operation is continued.

When the information stored in the input buffer 14 is continuation information, the file managing section 15 reads a length of data in the file corresponding to the record length from the position of the file pointer, and writes the read data in the input buffer 14 (Step S26). The file managing section 15 then moves the file pointer forward by an amount corresponding to the read data (Step S27). The record information control section 13 detects the record length from the record-length information stored in the input buffer 14 (Step S28). Then, the file managing section 15 reads a length of data in the file corresponding to the record length from the position of the file pointer, and writes the read data in the input buffer 14 (Step S29). Subsequently, the file managing section 15 moves the file pointer forward by an amount corresponding to the read data (Step S30). The record information control section 13 transfers the record to the file access control section 10, which in turn notifies the record to the user (Step S31). The flow then returns to Step S20, and the aforementioned steps are again executed from the determination as to whether the subsequent information is end-of-file information or continuation information. The loop including this determination and the reading of the record length and record continues until end-of-file information is detected.

Figure 7:
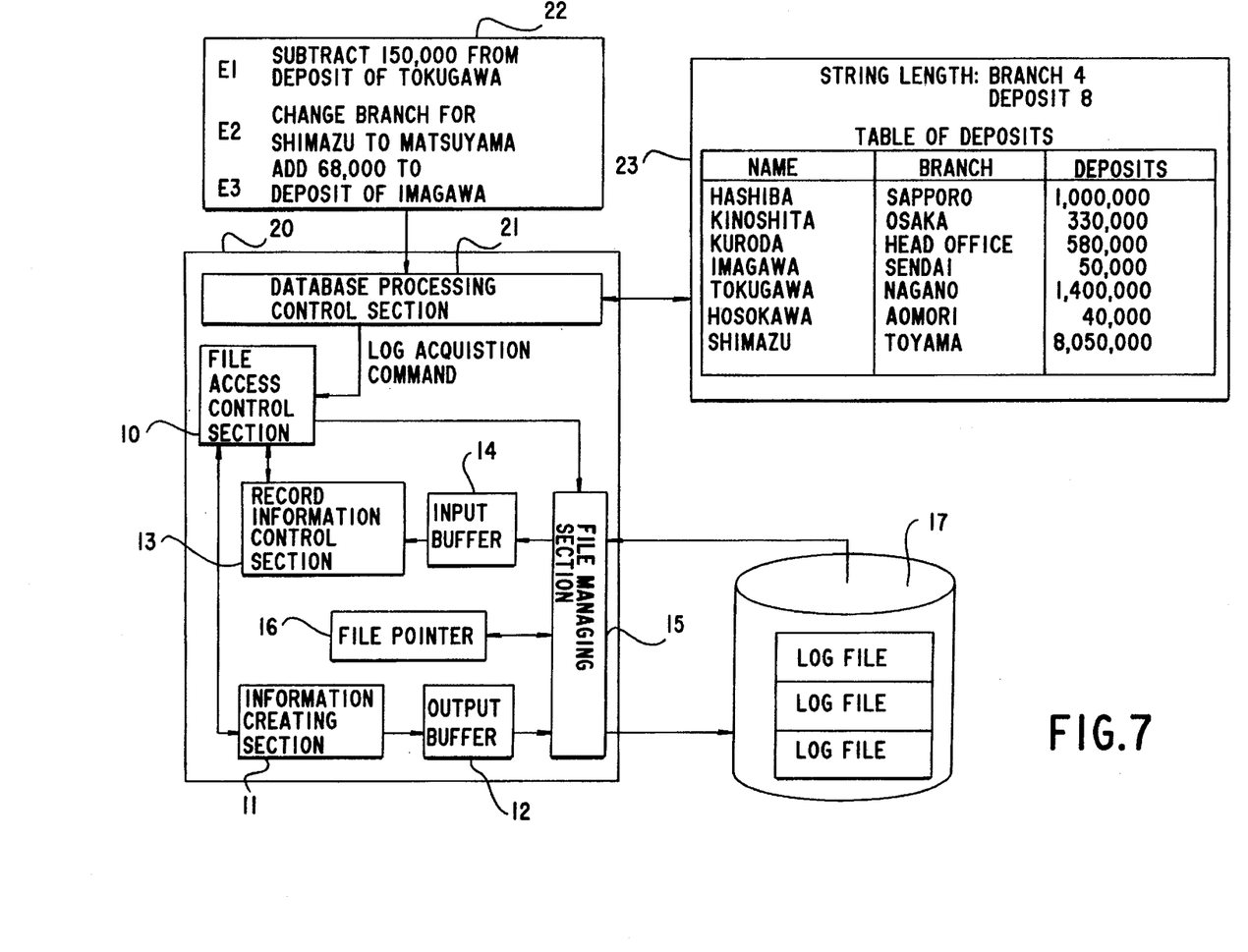
FIG. 7 is a diagram showing the configuration of a database processing system to which the present invention is applied.

FIG. 7 illustrates the configuration of a database processing system to which the present invention is applied. As illustrated, a database processing system 20 is composed of a database processing control section 21, and the record appending apparatus shown in FIG. 3. In FIG. 7, like reference numerals are used to denote like elements appearing in FIG. 3. The database processing system 20 receives a process 22 including, for example, transactions E1, E2 and E3, at the database processing control section 21, and updates the contents of a database 23 in accordance with the process 22. In the illustrated example, the record appending apparatus is used for storing log files retaining update history logs which are modified when a spreadsheet-type database is updated. Accordingly, the files stored in the storage device 17 are log files in which historical data representing transactions is sequentially accumulated (appended) so that the past changes can be identified later.

Figure 8:
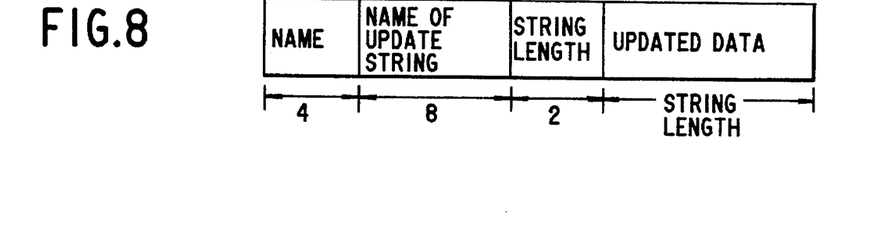
FIG. 8 is a diagram showing an example of a record structure.

FIG. 8 illustrates an example of a record structure. The record is transferred from the database processing control section 21 to the record appending apparatus, and corresponds to the record 7 shown in FIG. 2. In the illustrated example, the record is composed of "NAME" specifying a row of the database 23 to be updated, "UPDATE STRING NAME" specifying an item to be updated ("BRANCH" or "DEPOSIT"), "STRING LENGTH" specifying the length of the item to be updated ("4" if the "UPDATE STRING NAME" is "BRANCH", and "8" if the "UPDATE STRING NAME" is "DEPOSIT"), and "UPDATED DATA" specifying the updated value for the row concerned. In the record shown in FIG. 8, the record length equals the sum of "4" for "NAME", "8" for "UPDATE STRING NAME", "2" for "STRING LENGTH", and the string length of "UPDATED DATA".

Figure 9:
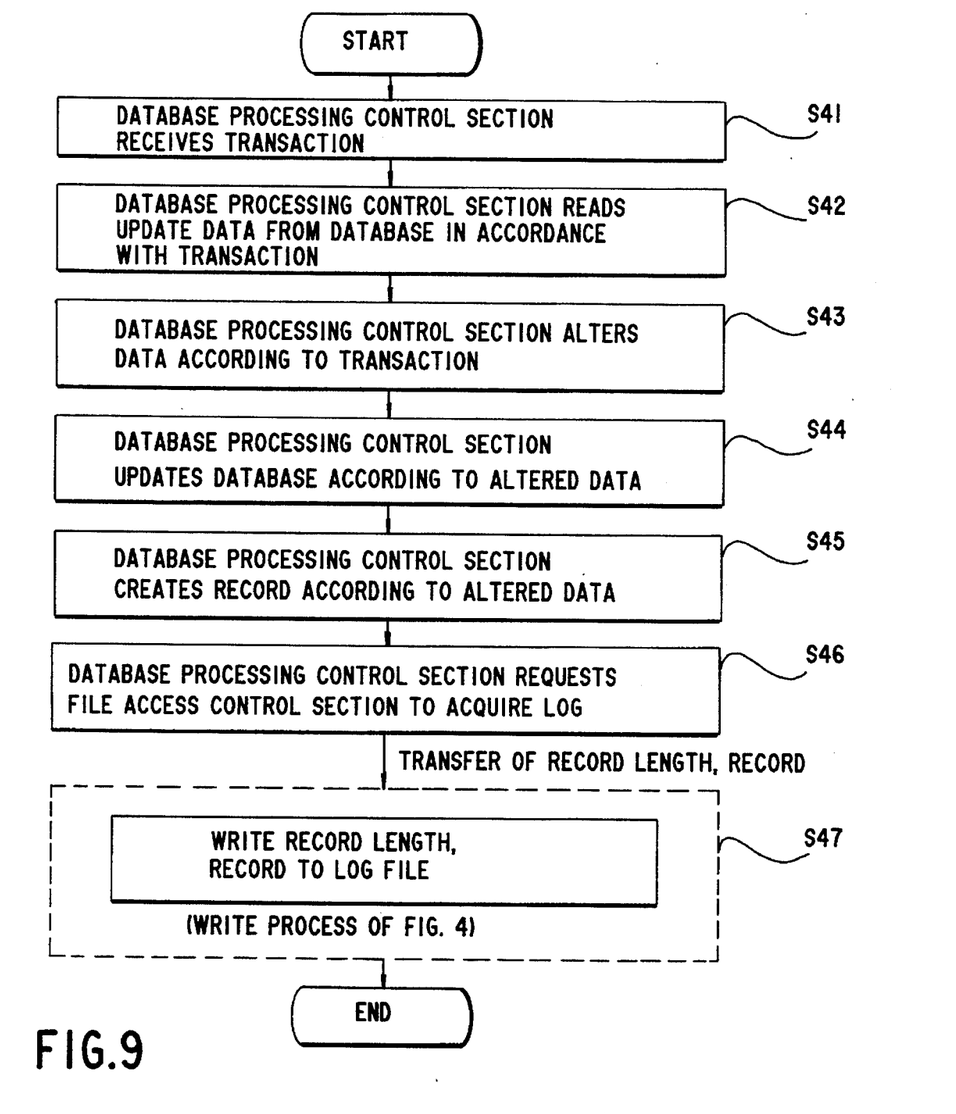
FIG. 9 is a flowchart of a process for acquiring an update history log.

FIG. 9 is a flowchart of a process for acquiring an update history log. Referring to the flowchart, how historical data is logged in the log file by the database processing system 20 of FIG. 7 will be explained.

First, the database processing control section 21 receives one of the transactions E1, E2 and E3 (in the order named) from the process 22 (Step S41). Based on the transaction received, the database processing control section 21 reads that data from the database 23 which is to be updated (Step S42), and alters the read data according to the transaction (Step S43). The database processing control section 21 then stores the altered data in the database 23 at the location where the data is read, thereby updating the database 23 (Step S44). Subsequently, the database processing control section 21 creates a record (see FIG. 8) for acquiring a log (Step S45), and supplies a log request to the file access control section 10 (Step S46).

At this time, the file access control section 10 is supplied with the record length and the record, and appends the received data to the log file in accordance with the record write process shown in FIG. 4, thus completing acquisition of the log of the process 22 (Step S47).

Figure 10:
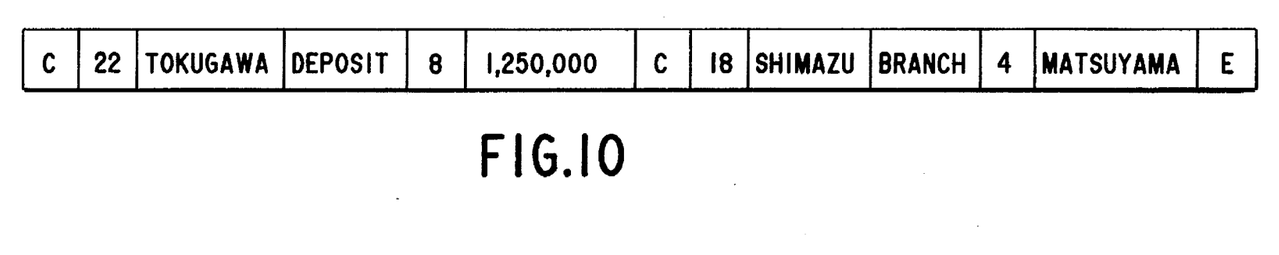
FIG. 10 is a diagram showing an example of contents of a rewritten log file.

FIG. 10 illustrates an example of contents of a log file to which data has been written. In the illustrated example, the transactions E1, E2 and E3 supplied to the database processing control section 21 are sequentially executed, and it is assumed that a system failure occurred during the processing of the transaction E3 due to, e.g., power outage.

In the example of FIG. 10, the record length "22" and the record "TOKUGAWA, DEPOSIT, 8, 1,250,000" are written according to the transaction E1, and subsequently the record length "18" and the record "SHIMAZU, BRANCH, 4, MATSUYAMA" are written according to the transaction E2. If subsequent data of the read file becomes unrecognizable, then it means that the processing failed to continue by the time the record length, record, and end-of-file information of the transaction E3 are written, that is, before the end-of-file information written by the transaction E2 is altered to continuation information at the latest. Thus, even if a hazardous state occurs during the processing of the transaction E3, at least the last update point of data written by means of the previous transaction E2 is recognizable, thereby minimizing the labor associated with the recovery of data.

As described above, according to the present invention, end-of-file information always exists at the end of a file, and thus, if a hazardous state occurs during write operation due to system failure or the like, the last effective update point of the file is reliably retained, and the end-of-file (EOF) information can be detected when the file is read later. In the example mentioned above, if the system goes down at some point of time during the processing of the transaction E3 and the spreadsheet-type database is entirely destroyed, the log file retains records as shown in FIG. 10. Accordingly, where a backup copy of the database is preserved prior to the processing, the database can be recovered such that the contents thereof are identical with those retained just before the system failure, by using the backup copy and the records in the log files. Thus, only the process during which the system failure occurred need be repeated. Consequently, file access management resistant to fault can be achieved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A record appending method for appending new data to a file having first end-of-file information at an end thereof, comprising the steps of:

writing new data having second end-of-file information at an end thereof, subsequently to the first end-of-file information of the file, wherein the new data follows the first end-of-file information at the end of the file; and altering the first end-of-file information of the file to be continuation information indicating continuity of the file, wherein the continuation information links the new data to the file and the second end-of-file information indicates a new end of the file.

2. The record appending method according to claim 1, wherein said new data writing step includes receiving a record length and a record of data to be appended, creating a writing data including the record length, the record, and second end-of-file information in an output buffer in a format according to which data is to be written to the file, providing a request to write contents of the output buffer to the file, and writing the contents of the output buffer at a location of the file specified by a file pointer.

3. The record appending method according to claim 1, wherein said information altering step includes moving a file pointer backward by an amount corresponding to a length of the first end-of-file information, creating continuation information having a length equal to that of the first end-of-file information, in an output buffer, providing a request to write contents of the output buffer to the file, writing the contents of the output buffer at a location of the file specified by the file pointer, and moving the file pointer forward by an amount corresponding to the length of the continuation information plus a length of the written new data with the second end-of-file information.

4. A record appending apparatus for appending new data to a file having first end-of-file information at an end thereof, comprising:

file access control means for controlling read and write operationls of information and operation of a file pointer with respect to the file;

information creating means for creating a record length, a record, second end-of-file information, and continuation information to be written in the file;

output buffer means for storing the record length, the record, the second end-of-file information, and the continuation information created by said information creating means according to respective write units;

record information control means for detecting continuation information and a record length to identify a record when information is read from the file;

input buffer means for temporarily storing any length of information read from the file;

file managing means for writing the information stored in said output buffer means to the file, and for reading the information into said input buffer means;

file pointer storing means for storing a data write or read position of the file; and storage means for storing the file.

* * * * *